June 25, 1963  E. E. BROBERG  3,094,895
COMBINATION PIERCING, REAMING AND TAPPING SCREW
Original Filed Dec. 6, 1955

Inventor
Elmer E. Broberg
By Olson, Mecklenburger, von Holst,
Pendleton & Neuman, Attys.

United States Patent Office 3,094,895
Patented June 25, 1963

3,094,895
COMBINATION PIERCING, REAMING AND TAPPING SCREW
Elmer E. Broberg, Rockford, Ill., assignor to Elco Tool and Screw Corporation, Rockford, Ill., a corporation of Illinois
Continuation of application Ser. No. 720,796, Mar. 11, 1958, which is a continuation of application Ser. No. 551,475, Dec. 6, 1955. This application Feb. 28, 1961, Ser. No. 92,238
4 Claims. (Cl. 85—47)

This application is a continuation of my copending application Serial No. 720,796, filed March 11, 1958, which copending application is in turn a continuation of my earlier-filed application Serial No. 551,475, filed December 6, 1955, which earlier-filed application is in turn a continuation-in-part of my still-earlier-filed application Serial No. 255,903, filed November 13, 1951, and all now abandoned.

This invention relates to what, for convenience, is referred to as a drill-tap screw although it is a combination piercing, reaming and tapping screw. It is adapted for use in all kinds of sheet metal and repair work and for fastening generally in plastic sheet materials and various kinds of thin sheet metals, namely, copper, aluminum, steel, and brass (sheet or cast). These screws are adapted to be used with ordinary power screw drivers, but are even better adapted for use with what are known as gun drills, where the bit is operated first as a hammer to make the screw point pierce the work and is then turned to drive the screw home. Of course, for occasional use, these screws can be first struck with a hammer to pierce the hole and then screwed home with a regular screw driver.

The principal object of my invention is to provide a screw of the kind mentioned that is of simple construction, well adapted for the purposes intended, and capable of being produced easily in quantities by well known machine methods at low cost.

In the screw of my invention, the thread starts a short distance above a conically tipped shank end and extends upwardly through a tapered portion and subsequent cylindrical shank portion to the headed end of the screw. The threads are at zero height at their origin adjacent the conical tip and reach full height adjacent the juncture of the tapered and cylindrical shank portions. It is also worth mentioning that in rolling the thread between dies those threads on the entering portion are almost invariably rough on the periphery or crest and that is beneficial in the tapping operation because it gives a sawing action, thereby making it easier to work the screw in. To provide a piercing and reaming end on the screw one side of the shank has a V-shaped groove milled into one side of the lower entry portion extending upwardly from the tip at an acute angle to the longitudinal axis of the screw into the lower portion of the tapered section of the shank, thus providing a half-cone tip capable of piercing the metal readily, after which the specially grooved lower end portion of the shank reams out to a nearly round form the jagged hole produced in the initial piercing operation, and then the thread, the lower end portion of which extends into the drill section, commences to take hold and the tapping function occurs. Whereas it might appear that for best results a drill tap screw should be so constructed that it will first drill a clean smooth hole in the material and then tap the hole as the screw is turned home, I have found that the screws tend to hold much better if the hole that is produced in the piercing and reaming action that precedes the tapping is not clean and smooth but, on the contrary, the metal is swaged or extruded to form a rather roughly defined flange around the hole, because in that way a longer hole is provided than the thickness of the metal alone would afford in the case of a clean smooth hole, and the longer hole, when tapped, affords much better purchase for the threads of the screw, so that the screw holds more securely and is not nearly so apt to loosen as otherwise.

Referring to the accompanying drawings.

The same reference numerals are applied to corresponding parts in these four views.

Figure 1:
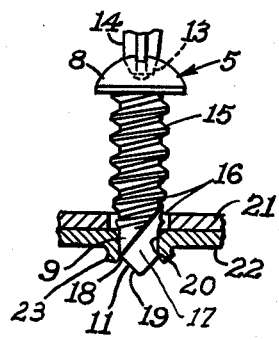
FIGS. 1 and 2 are enlarged side views taken at different angles of a screw made in accordance with my invention, FIG. 1 showing how the piercing and reaming portion of the shank and the self-tapping thread extending into it cooperate in driving home of the screw into the work.
Figure 2:
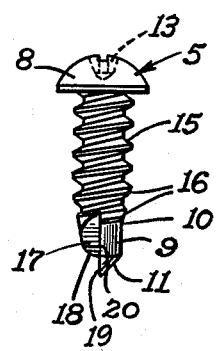
Figure 4:
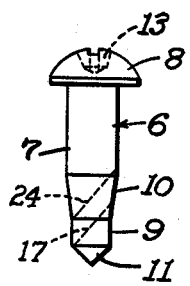
FIG. 4 is an enlarged side view of the screw blank.
Figure 3:
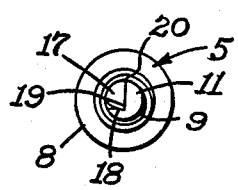
FIG. 3 is a bottom end view.

The screw 5 of FIGS. 1–3 is made from a steel blank like that shown at 6 in FIG. 4. The blank comprises a cylindrical shank 7 that has a head 8 on its upper end and is tapered near its lower end 9, as at 10, and has a conical tip 11. The tip shown has a 90° included angle at the point, but a sharper point may, of course, be provided. The shape of the head 8 depends upon the particular use to which the screw is to be put. In the present case it is flat on the bottom to engage the work and is rounded on top, and has a cross-shaped socket 13 in the center of the top adapted to receive a screwdriver bit 14 of complementary form. The shank 7 is rolled between dies to form a fairly coarse thread 15 thereon extending helically downwardly from the head 8 throughout the major portion of the length of the shank, including the tapered portion 10 and a part of the entry portion adjacent the tip. The thread shown is a conventional V-thread that is best adapted for the self-tapping function. In the formation of the thread 15, the lower end portion 16, which is the tapping portion, tapers off to zero height on the entry portion, as required for good tapping, and the first turn or so is usually rough and relatively sharp on the periphery or crest, thereby facilitating the tapping operation by a sort of sawing action. The lower end portion 9—10 of the shank 7 has a rectilinear or V-shaped groove 17 milled in one side extending from the conical tip portion 11 upwardly at an acute angle to the longitudinal axis of the screw to define at the lower end of the groove a sharp piercing edge 18 and contiguous therewith and at angular relation thereto a V-shaped cutting or piercing edge 19 which edges cooperate in the piercing function. The other side of the groove, as best appears in FIGS. 2 and 3, is in a plane at right angles and includes the axis of rotation of the screw and defines a sharp reaming edge 20 on the periphery of the smooth lower end portion 9 of the shank. The cutting away of nearly half of the conical tip 11 makes a sharper spear point so that it is an easy matter to make the screw pierce the sheet metal. The lower end portion 16 of the thread is adapted to work like a tap and commences to cut a thread immediately following the operation of the combined piercing and reaming portion 18—20.

In operation, these drill-tap screws are used in all kinds of sheet metal work, repair work and fastening generally, with all kinds of thin sheet metals and plastic sheet materials. For example, I have shown the screw in FIG. 1 being used to fasten together two pieces 21 and 22 of sheet metal. The cutaway conical tip 11 is adapted to be started in the sheet metal by a hammer blow and then screwed in with a regular screw driver. However, for thin sheet metal assembly work an ordinary power screw driver can be used. When a gun drill is used, the bit of such a tool is first operated itself as a hammer to make the tapered point 11 pierce the work and then the bit is turned, causing the screw to ream and tap the hole that has been pierced, and then drive the screw home. In any event, the jagged hole that is produced in the initial piercing, as indicated by the swaged or extruded flange portion 23, is roughly reamed out by the edge 20 to a nearly round form in the first few turns, such edge leading in the same direction as that in which the screw is turned to thread it into the material, and then the thread 15, the tapered off end portion 16 of which extends into the piercing and reaming portion just far enough, commences to take hold and the self-tapping function follows and the screw is threaded all the way in. The groove 17 affords chip clearance in the reaming and initial tapping operation besides defining the piercing edges 18 and 19 and reaming edge 20. The longer hole that is afforded as a result of the rather roughly defined flange portion 23 I have found accounts for the drill-tap screws of my invention taking hold much more securely than they would otherwise, and there is less likelihood of the screws tending to loosen.

In the production of the screw 5 the blanks 6 are first headed as at 8, then pointed as at 11, then threaded as at 15 by rolling between parallel dies, and finally milled off on one side of the lower end portion to provide the right angle or V-shaped groove 17 at the inclination shown. All of these operations are capable of being performed easily with presently available equipment so that these screws can be produced in quantities at low or at least competitive costs. The finished screws are suitably hardened to prevent blunting of the piercing edges 18 and 19, reaming edge 20, and screw thread 15—16.

I have found, by way of a modified structure as shown in dotted lines in FIGS. 1 and 4 to be hereinafter further described, that the thread takes a better hold in its application when the angular groove is milled across the shank of the screw at an elevated position above the location of groove 17 hereinbefore described. For example, dotted lines 24 (FIGS. 1 and 4) indicate the upper angular face of the elevated groove, the upper extremity of which extends for a limited portion thereof into the upper cylindrical, holding portion of the screw shank.

This higher location of the angular groove makes the sharp peripheries of the threads of the screw stand out even better than with other milling, as at 17, so that these threads are more certain to take hold and tap immediately after the hole is produced. The upper groove 24, similarly as the groove 17, provides chip clearance for drilling, reaming and tapping, and I have found screws made in conformity with this modified structure drill through the sheet metal most satisfactorily and the exposure of the last two threads on the reaming edge 20 helps to insure that these threads take hold immediately for tapping function.

It is believed the foreging description conveys a good understanding of the objects and advantages of my invention. The appended claims have been drawn to cover all legitimate modifications and adaptations.

I claim:

1. A screw for piercing a hole in material and then reaming and tapping the hole prior to being screwed to a tightened position in the material, said screw comprising an elongated shank terminating at its upper end in a head and at its lower end in a tapered piercing point, said shank including an upper cylindrical portion adjacent said head and a lower cylindrical portion of reduced diameter interconnected by a tapered portion decreasing in diameter from that of said upper portion to that of said lower portion, said lower cylindrical portion terminating in said tapered point, a screw thread on said shank extending helically downwardly from said head, said thread terminating at the junction between said tapered portion and said lower cylindrical portion and being gradually diminished in height on said tapered portion to zero height at the lower end of said tapered portion, said shank having on one side thereof an elongated groove provided therein at an actue angle to the longitudinal axis of the screw extending from and open to one side of the shank shortly above the lower end of the thread downwardly to and opening on the opposite side of said shank and terminating at said tapered point, one side of said groove defining at its lower end a piercing edge in contiguous and transverse relation to a V-shaped piercing edge defined by the other side of the groove on the tapered point, said piercing edges cooperating to pierce through the material upon delivery of a hammer blow to the head end of the screw, said other side of said groove being in a diametrical plane including the longitudinal axis of the screw and defining a reaming edge on the periphery of said lower cylindrical portion, said reaming edge leading in the same direction as that in which the screw is turned to thread it into the material and serving to round out the hole preparatory for the tapping, said groove being of substantially right angle form in cross section throughout the length thereof with the first named piercing edge lying entirely in a plane oblique to the axis of the screw.

2. A screw for piercing a hole in material and then reaming and tapping the hole prior to being screwed to a tightened position in the material, said screw comprising an elongated shank terminating at its upper end in a head and at its lower end in a tapered piercing point, said shank including an upper cylindrical portion adjacent said head and a lower cylindrical portion of reduced diameter interconnected by a tapered portion decreasing in diameter from that of said upper portion to that of said lower portion, said lower cylindrical portion terminating in said tapered point, a screw thread on said shank extending helically downwardly from said head, said thread being gradually diminished in height on said tapered portion to zero height on the lower end portion of said tapered portion, said threads on said tapered portion having sharp peripheries, said shank having one side of its lower extremity recessed with a substantially right angle groove so that there are two sides to the recess, one side of the recess being in a diametrical plane and defining a V-shaped piercing edge on the tapered point and a reaming edge on the periphery of the lower cylindrical portion and tapered portion which leads in the same direction as that in which the screw is turned to thread into the material and serves to round out the hole started by the V-shaped piercing edge preparatory for tapping, the other side of the recess being in a plane substantially at right angles to the aforesaid diametrical plane and inclined in the same direction as the aforesaid threads lead but at a smaller angle to the axis of the screw and having its upper end above at least the lower two screw threads so that these screw threads define projections on the upper end portion of said reaming edge.

3. A screw for piercing a hole in material and then reaming and tapping the hole prior to being screwed to a tightened position in the material, said screw comprising an elongated shank terminating at its upper end in a head and at its lower end in a tapered piercing point, said shank including an upper cylindrical portion adjacent said head and a lower cylindrical portion of reduced diameter interconnected by a tapered portion decreasing in diameter from that of said upper portion to that of said lower portion, said lower cylindrical portion terminating in said tapered point, a screw thread on said shank extending helically downwardly from said head, said thread terminating at the junction between said tapered portion and said lower cylindrical portion and being gradually diminished in height on said tapered portion to zero height at the lower end of said tapered portion, said shank having on one side thereof an elongated groove provided therein at an acute angle to the longitudinal axis of the screw extending from and open to one side of the shank downwardly to and opening on the opposite side of said shank and terminating at said tapered point, one side of said groove defining at its lower end a piercing edge in contiguous and transverse relation to a piercing edge defined by the other side of the groove on the tapered point, said piercing edges cooperating to pierce through the material upon delivery of a hammer blow to the head end of the screw, said other side of said groove being in a diametrical plane including the longitudinal axis of the screw and defining a reaming edge on the periphery of said lower cylindrical portion, said reaming edge leading in the same direction as that in which the screw is turned to thread it into the material and serving to round out the hole preparatory for the tapping, said groove being of substantially right angle form in cross section throughout the length thereof with the first named piercing edge lying entirely in a plane oblique to the axis of the screw.

4. A screw as claimed in claim 3, wherein the elongated groove extends shortly above the lower end of the thread to provide a serrated cutting edge.

References Cited in the file of this patent

UNITED STATES PATENTS

| | | |
|---|---|---|
| 385,088 | Benzie | June 26, 1888 |
| 1,809,758 | Rosenberg | June 9, 1931 |
| 1,867,526 | Anderson | July 12, 1932 |
| 2,015,159 | Rosenberg | Sept. 24, 1935 |
| 2,093,172 | Olson | Sept. 14, 1937 |
| 2,403,359 | Gerhold | July 2, 1946 |
| 2,479,730 | Dewar | Aug. 23, 1949 |